United States Patent
Kemeny et al.

(10) Patent No.: US 6,267,798 B1
(45) Date of Patent: Jul. 31, 2001

(54) COMPOSITION FOR TREATING STEEL MAKING SLAGS

(75) Inventors: Francis L. Kemeny, Lewiston, NY (US); William W. West, Warren, OH (US)

(73) Assignee: Nuflux, LLC, Warren, OH (US)

(*) Notice: Subject to any disclaimer, the term of this patent is extended or adjusted under 35 U.S.C. 154(b) by 0 days.

(21) Appl. No.: 09/496,573

(22) Filed: Feb. 2, 2000

(51) Int. Cl.$^7$ .................................................. C21C 7/076
(52) U.S. Cl. .................................................. 75/312
(58) Field of Search .................................................. 75/312

(56) References Cited

FOREIGN PATENT DOCUMENTS

1143526 * 2/1969 (GB).

OTHER PUBLICATIONS

ACS abstract of JP–62180713–A2 by Tozawa, Aug. 8, 1987: "Prevention of Slag Foaming in Steelmaking."*

* cited by examiner

Primary Examiner—Roy King
Assistant Examiner—Tima McGuthry Banks
(74) Attorney, Agent, or Firm—Greenwald & Basch LLP; Howard J. Greenwald

(57) ABSTRACT

A slag composition containing steelmaking slag and from about 0.5 to about 10 weight percent of reducing agent. The steelmaking slag contains from about 25 to about 55 weight percent of calcium oxide, from about 10 to about 50 weight percent of ferrous oxide, from about 5 to about 20 weight percent of magnesium oxide, from about 5 to about 20 weight percent of silicon oxide, and from about 0.5 to about 8 weight percent of manganese oxide. The reducing agent contains both calcium carbide and elemental aluminum. From about 5 to about 80 weight percent of the reducing agent is comprised of calcium carbide, and from about 10 to about 50 weight percent of such reducing agent is comprised of elemental aluminum.

18 Claims, 1 Drawing Sheet

COMPOSITION FOR TREATING STEEL MAKING SLAGS

FIELD OF THE INVENTION

An additive for making a ladle slag composition which comprises calcium carbide, aluminum, and optionally at least one fluxing agent selected from the group consisting of calcium aluminate, glass, oxides of elements of Groups IA, IIA, IIIA, IVA of the Periodic table, fluorides of elements of Groups 1A, IIA, and IIIA of the Periodic table, silicon carbide, and mixtures thereof, and from about 0 to about 20 weight percent of a metal carbonate.

BACKGROUND OF THE INVENTION

U.S. Pat. No. 5,279,639, of Frank L. Kemeny et al., discloses a composition for synthesizing and treating ladle slags comprised of from about 5 to about 50 percent of calcium carbide, from about 10 to about 20 weight percent of magnesium carbonate, from about 40 to about 55 percent of calcium carbonate, from about 5 to about 20 weight percent of alumina, and from about 2 to about 5 weight percent of coke. The entire disclosure of this United States patent is hereby incorporated by reference into this specification.

The composition of such Kemeny patent is effective and has achieved a substantial amount of commercial success. However, since the commercial introduction of this composition, pressures have increased upon the steel making industry to substantially increase productivity, especially with the increased sales of foreign steel dumped into this country. One problem with the prior Kemeny composition is that is takes a relatively long period of time for it to treat the slag in order to produce the desired slag composition.

The desired refining slag composition disposed on top of the steel in the ladle will vary according to steel grade and other parameters. In general, however, this desired refining slag composition is comprised of from about 45 to about 65 weight percent of calcium oxide, from about 5 to about 30 weight percent of aluminum oxide, from about 5 to about 15 weight percent of magnesium oxide, from about 4 to about 25 weight percent of silicon oxide, from about 0 to about 15 weight percent of calcium fluoride, and from about 0.1 to about 8 weight percent of a mixture containing ferrous oxide and manganese oxide.

The desired refining slag preferably serves to provide a continuous partially molten oxide phase on the surface of the steel being treated, to capture and retain inclusive non-metallic material present in the steel (such as aluminum oxide), to be either non-oxidizing or reducing with respect to the steel, to control the sulfur content of the steel, to provide a non-corrosive environment for the refractory ladle linings, to promote stable arcing during electric arc reheating in the ladle, to protect the steel from contact with the atmosphere, and to provide thermal insulation.

It is an object of this invention to provide a novel additive for treating ladle slag which more readily facilitates the production of the desired ladle slag than prior art compositons.

It is another object of this invention to provide a novel additive for treating ladle slag which achieves the desired results at a lower concentration than prior art compositions.

SUMMARY OF THE INVENTION

In accordance with this invention, there is provided an additive for making a ladle slag composition which comprises calcium carbide, aluminum, and optionally at least one fluxing agent selected from the group consisting of calcium aluminate, glass, oxides of elements of Groups IA, IIA, IIIA, IVA of the Periodic table, fluorides of elements of Groups 1A, IIA, and IIIA of the Periodic table, silicon carbide, and mixtures thereof, and from about 0 to about 20 weight percent of a metal carbonate

BRIEF DESCRIPTION OF THE DRAWINGS

The invention will be described by reference to the specification, the claims, and the drawing in which like elements are depicted by like numerals, and in which:

DESCRIPTION OF THE PREFERRED EMBODIMENTS

Figure 1:
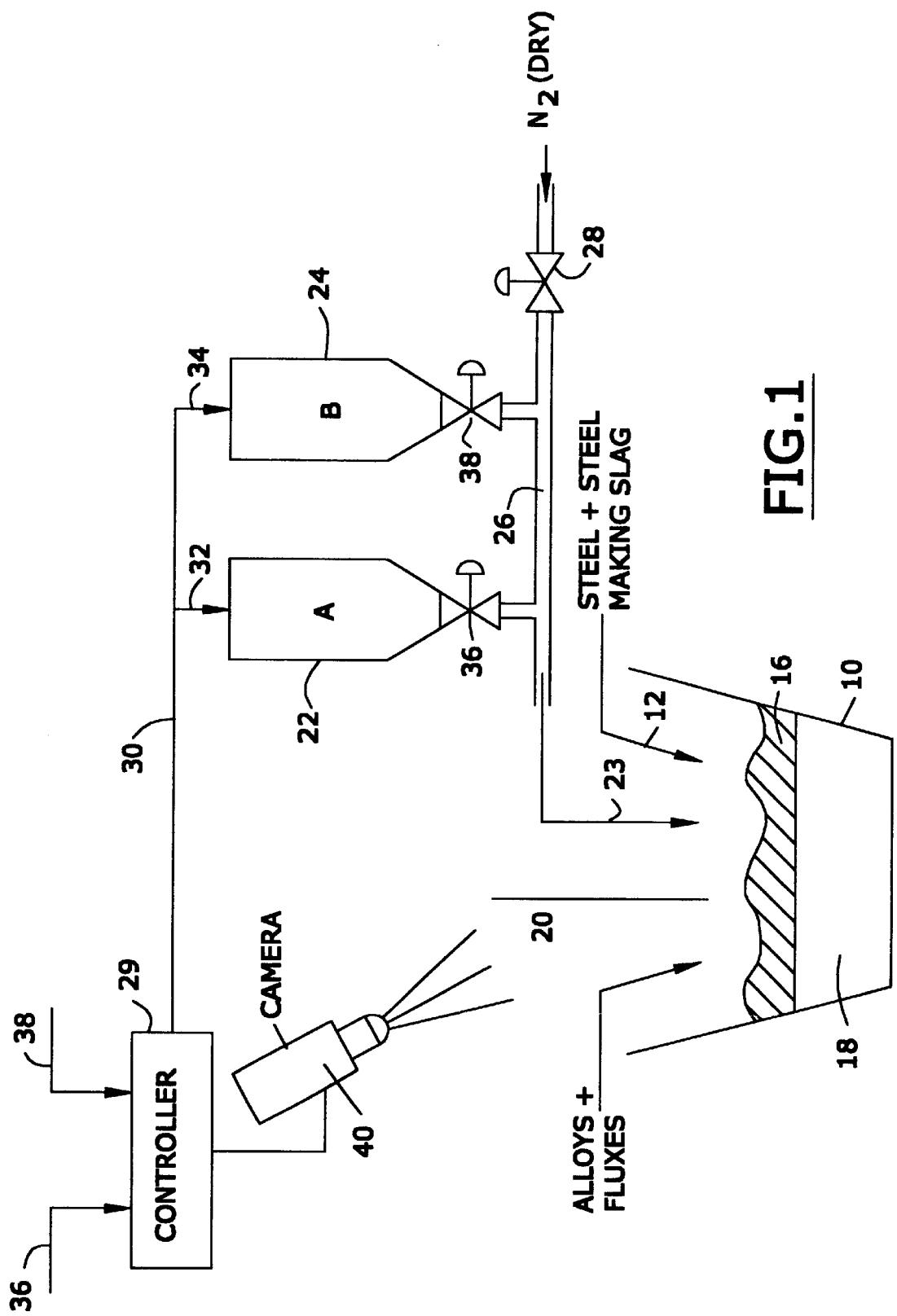
FIG. 1 is a flow chart of a preferred process for producing the desired slag.

The preferred additive of this invention for making a ladle slag composition is comprsied of calcium carbide, aluminum, and at least one fluxing agent selected from the group consisting of calcium aluminate, glass, oxides of elements of Groups IA, IIA, IIIA, IVA of the Periodic table, fluorides of elements of Groups 1A, IIA, and IIIA of the Periodic table, silicon carbide, and mixtures thereof, and from about 0 to about 10 weight percent of a metal carbonate The preferred additive is comprised of from about 5 to about 60 weight percent, by total weight of additive, of calcium carbide. It is preferred that the calcium carbide be in particulate form and that at least about 90 weight percent of its particles have a particle size in the range between from about 0.1 to about 0.7 inches. In an even more preferred embodiment, at least about 90 weight percent of the calcium carbide particles have a particle size in the range of from about 0.25 to about 0.4 inches.

Without wishing to be bound to any particular theory, applicants believe that the use of calcium carbide with the desired particle size distribution contributes to the desired an unexpected efficacy of applicants' composition.

In one preferred embodiment, from about 30 to about 50 weight percent of the calcium carbide is used in the composition of the invention.

One may use any of the commercially available calcium carbide compositions to produce the additive of this invention. Thus, e.g., one may use commercial grade calcium carbide such as, e.g., miner's grade calcium carbide which may contain about 85 weight percent of calcium carbide. Such miner's grade calcium carbide is sold, e.g., by The Carbide/Graphite Group, Inc. of Pittsburgh, Pa.

The preferred additive of this invention also comprises from about 10 to about 70 weight percent of aluminum. In one embodiment, the additive is comprised of from about 20 to about 50 weight percent of aluminum.

The aluminum used to form the additive of this invention may be pure elemental aluminum. Alternatively, or additionally, it may be elemental aluminum in combination with other materials. Thus, aluminum dross, which contains elemental aluminum, often is used as one reagent for making the additive of this invention.

The use of various aluminum dross compositions in steel-making processes is well known. Thus, e.g., U.S. Pat. No. 5,284,504 of Bruce J. Barker discloses the use of a powdered desulfurizing reagent containing from about 0 to about 99.9 percent of calcium carbide and from about 1 to about 10 weight percent of aluminum dross. Thus, e.g., U.S. Pat. No. 5,385,601 of Francis L. Kemeny et al. discloses that aluminum drosses are classified according to the amount of sodium chloride/potassium chloride salt they contain. Primary aluminum producers use little or no salt in their processes, and the dross they produce is referred to as "white dross." In the secondary refining of aluminum and in aluminum dross processing, sodium chloride/potassium chloride salt is used more widely. The salts increase the interfacial tension of the dross/aluminum system and allow metallic aluminum to coalesce and be separated from the oxide more easily.

However the aluminum used is the process of the invention is constituted, whether by itself or in admixture with other material(s), it is preferred that the aluminum and/or the alumum-containing material have a particle size distribution such that at least about 90 weight percent of its particles have a particle size in the range between from about 0.1 to about 0.7 inches. In an even more preferred embodiment, at least about 90 weight percent of the aluminum and/or the aluminum-containing particles have a particle size in the range of from about 0.25 to about 0.4 inches.

Without wishing to be bound to any particular theory, applicants believe that the particle size distribution of the aluminum and/or the aluminum-containing material must be substantially the same as the particle size distribution of the calcium carbide material. If the particle size distributions of these materials differ substantially, segregation of the particle compacts within the mixture occurs during shipment of the material, and a non-homogeneous additive is produced.

Regardless of how much calcium carbide and elemental aluminum individually are present in the additive composition, it is preferred that, in one embodiment, in combination, the calcium carbide and the elemental aluminum comprise no more than about 70 weight percent of the desired additive.

The use of aluminum in the additive of this invention is unexpectedly advantageous. When the aluminum is not present in the additive, the reaction rate is substantially slower and all of the advantages of the additive are not achieved. This is not obvious, for the use of aluminum in such additives is contraindicated in the prior art. Thus, e.g., in U.S. Pat. No. 5,279,639, it is disclosed that "Aluminum is expensive, increases alumina content of the slag, and is an alloying element in the steel, so variability of its concentration is undesirable."

The additive of this invention, when added to the slag to be treated, undergoes an exothermic reaction which facilitates the production of the desired slag.

The slag to be treated may vary in composition. One typical such slag contains 45 weight percent of calcium oxide, 28 weight percent of ferrous oxide (FeO), 12 weight percent of magnesium oxide, 10 weight percent of silicon oxide, and 5 weight percent of manganese oxide. Typically, during the steel making process, such a slag is at a temperature of about 2,900 degrees Fahrenheit.

When 20 weight percent of the additive of the invention (by total weight of slag to be treated and additive) is added to the slag, and the slag is maintained at a temperature of 2,900 degrees Fahrenheit by constant heat input, the desired refining slag is produced in no more than about 15 minutes. It is noteworthy that the composition of U.S. Pat. No. 5,279,639 is not capable of achieving this result within the specified time.

In one embodiment, the additive of this invention contains from about 25 to about 30 weight percent of metallic aluminum, and from about 70 to about 75 weight percent of the aforementioned calcium carbide, by total weight of aluminum and calcium carbide. In this embodiment, one may add additional flux material to the additive, but need not do so. It will be appreciated that, when concentrations of aluminum and/or calcium carbide are specified, these are the concentrations of the pure materials.

In another embodiment, a flux material is added to the aluminum and the calcium carbide. In this embodiment, no more than about 70 weight percent of the additive is comprised of aluminum and calcium carbide.

It is preferred that the fluxing agent used be selected from the group consisting of calcium aluminate, glass, oxides of elements of Groups IA, IIA, IIIA, IVA of the Periodic table, fluorides of elements of Groups 1A, IIA, and IIIA of the Periodic table, silicon carbide, and mixtures thereof, and from about 0 to about 20 weight percent of a metal carbonate.

The additive of this invention is preferably made by dry blending the calcium carbide, the aluminum-containing material, and, optionally, one or more of the fluxes in the desired stoichiometry.

The raw materials preferably contain less than about 0.2 weight percent of moisture and, if needed, are dried until the moisture content is reduced to or below this level.

The dried material can then be charged to a paddle mixer and dry blended. Typically, the materials are dry blended for from about 5 to about 15 minutes, depending upon the batch size. The blended material are then discharged into shipping containers.

Description of a Preferred Process for Using the Additive of this Invention

The present invention provides for the manufacture in situ of a ladle slag by the addition of a mixture of materials including aluminum, calcium carbide, and, optionally, one or more fluxing materials such as glass or other complex oxides of low melting point, alkali metal salts, alkali earth metal salts, and slag raw materials containing components such as silica, calcium fluoride, alumina, lime, magnesia, and calcium aluminate which are required to achieve the desired slag composition. Depending upon specific conditions at each ladle refining installation, it may be appropriate to manufacture in situ a ladle slag in more than one step through more than one addition of mixtures of the above materials.

Without wishing to be bound to any particular theory, when one or more fluxes are used, they dissolve the CaO and Al2O3 reaction products that form on the surfaces of the reductants during the reduction reaction, thereby presenting further reductant surfaces that may contact the slag to continue the reduction reactions.

The glass and calcium fluoride, when used, act as fluxes, i.e., they solubilize, other ingredients. Alumina, calcium fluoride, and lime are slag formers. These raw materials provide the components necessary to achieve a desired composition with appropriate physical and chemical properties for steel refining in the ladle. It should be noted that each component may serve multiple functions.

It should be appreciated that, although the invention is discussed in the context of secondary steelmaking, i.e., secondary ladle slags, the invention has applicability to a wide range of refining procedures. Similarly it should be understood that the sequence of steps and addition of composition components in accordance with the invention may be varied substantially depending upon the requirements of a particular application.

In one embodiment, the final slag properties and characteristics required or desired for a given ladle refining system are calculated or otherwise determined. The minimum amount of required ladle slag depth is established, usually around 2 inches if no arc reheating is applied, or 3 inches if arc reheating will be applied.

The primary furnace slag chemistry is measured or approximated using historical and real time data. The amount of this slag that is carried into the ladle is determined in two steps. First, the tendency for slag carry over is estimated based on historical data for the particular steel grade and steel making conditions, especially with regard to steel oxygen potential, duration of tapping, use of slag retention devices, condition of tap hole, etc.

One may then determine determine the amount of ferrous oxide (FeO) and manganese oxide (MnO) in the slag to be treated which must be reduced.

The tapping process is preferably observed, and the actual slag carry over quantity is measured using one or more of commercially available slag detection devices, or using visual means. The excess quantities of iron and manganese oxides in the ladle slag can now be calculated, and this amount will determine the required slag reductant.

One may then calculate amount of calcium carbide required, based on the amount of iron and manganese oxide to be reduced. The amount of gas generation from this amount of calcium carbide is calculated, and compared with what is thought to be the maximum acceptable amount of gas generation. If the gas generation or gas generation rate are predicted to be excessive, an amount of calcium carbide is substituted by an amount of aluminum to provide equal reducing power but to decrease the gas generation or gas generation rate to an acceptable level (the gas generation level that is acceptable will vary by location and process).

The amount of carbon that is picked up by the steel when using calcium carbide slag reducing agents is preferably determined depending on process parameters and desired final FeO level. This amount of carbon pick-up will add to the existing carbon level in the steel. In some cases, the incremental carbon will create an unacceptably high carbon content of the steel. In that case, the maximum amount, or tolerance for calcium carbide slag reducing agent is calculated. Aluminum based slag reductant will then be substituted to achieve the desired slag deoxidation.

In the above methodologies, calcium carbide tolerance is preferably first calculated, since calcium carbide slag reducing agents are less costly than aluminum based slag reducing agents. There are some instances where the tolerance for calcium carbide is very low, for example in ultra low carbon steels. In those cases, the primary slag reductant is aluminum based by necessity. The effectiveness of the aluminum based reductants can be greatly improved by the addition of calcium carbide. The calcium carbide causes agitation within the slag, thereby mixing the aluminum based conditioner into the slag for more efficient reaction. The calcium carbide also helps to dissolve the aluminum oxide reaction product, and helps to fluidize the slag. It also reduces the lime requirement in the reactant, thereby reducing its cost. In the case of ultra low carbon steels, a blend of aluminum, calcium carbide, and fluxes is added in the required amount to reduce the iron and manganese oxides. This blend will typically contain just enough calcium carbide to create the desired synergistic effect, with aluminum being the primary reducing agent. In this case, the ratio of calcium carbide to aluminum may be kept constant for each heat of steel that is treated.

The solubility of magnesia in the final desired slag composition is determined, and that amount may be added in the form of magnesia containing materials in the slag additive. The required fluxing agents are added to ensure that the lime and alumina reaction products generated by the reduction reactions are dissolved and that the reductant surface is continually available for contact with the iron and manganese oxides that are present in the slag. It will be appreciated that, when a particular step of the process calls for adding one or more fluxing agents, this step may be omitted when the desired composition does not contain such fluxing agent.

Other fluxing agents may be added such as, e.g., silica, calcium fluoride, alumina, carbon, lime, magnesia, and calcium aluminate; the addition of these reagents, in some embodiments, will round out the requirements necessary to achieve the desired slag composition and properties. Depending upon specific conditions at each ladle refining installation, it may be appropriate to manufacture in situ a secondary slag in more than one step through more than one addition of mixtures of the above materials.

The slag additives are added to the ladle during the tapping of steel, preferably approximately one-half to two-thirds through the tap, or alternatively to the top of the steel after the tap.

FIG. 1 is a flow diagram illustrating a preferred process of this invention.

Referring to FIG. 1, it will be seen that a ladle 10 receives via line 12 molten steel and molten steel making slag. The molten steelmaking slag generally contains from about 25 to about 55 weight percent of calcium oxide, from about 10 to about 50 weight percent of ferrous oxide (FeO), from about 5 to about 20 weight percent of magnesium oxide, from about 5 to about 20 weight percent of silicon oxide, and from about 0.5 to about 8 weight percent of manganese oxide.

The molten steel generally contains at least about 70 weight percent of molten, elemental iron and less than about 1 percent of elemental carbon dissolved therein.

The molten steel and the molten slag are charged in such concentrations via line 12 such that at least about 90 weight percent of the two components is comprised of molten steel. Generally, at least about 95 weight percent of the two components comprises molten steel.

Referring again to FIG. 1, which is not drawn to scale, it will be seen that the slag 16 is disposed on top of the molten steel 18, shielding it from the atmosphere 20. It will be appreciated that, although this is generally the situation in steel making, there are instances in which the slag layer 16 does not fully cover the molten steel 18.

To the ladle 10 comprising the molten steel 18 and the slag 16 is added a reductant, generally via line 23. In the preferred embodiment depicted in FIG. 1, the reductant is a combination of reagents "A" and "B", to be described in detail later in this specification. However, it should be understood that the control process depicted in FIG. 1 can be used with only one reductant, with two reductants, with three reductants, etc.

Thus, as is known to those skilled in the art, one may charge via line 23 as a reductant(s) calcium carbide, elemental aluminum, silicon carbide, ferrosilicon, and combinations thereof. The process of this invention may be used with any or all of these reductants and/or other reductants.

FIG. 1 illustrates a preferred process, in which reductant A is calcium carbide, and reductant B is elemental aluminum. For the sake of simplicity of operation, these reductants are added by the use of material which comprise these reductants. Thus, e.g., the calcium carbide is preferably used by charging miner's grade calcium carbide from hopper 22, and the aluminum is preferably used by charging aluminum dross (or any aluminum-containing material) from hopper 24.

In one embodiment of the process depicted in FIG. 1, only the calcium carbide and aluminum reagents are added. In another embodiment, one or more fluxing agents is also added. In this latter embodiment, the additional fluxing agent(s) may be charged from hopper 22, where it is present in admixture with the calcium carbide material. Alternatively, one or more of the additional fluxing agent(s) may be present in hopper 24 admixed with the aluminum material. Alternatively, all of the reagents may be present in admixture in one hopper (not shown)

Referring again to FIG. 1, and in the preferred embodiment depicted therein, it will be seen that material dispensed from hoppers 22 and 24 are forced through pipe 26, preferably by means of dry gas transport. In the embodiment depicted, a valve 28 allows nitrogen to flow through pipe 26 and to force the material from hoppers 22 and 24 through such pipe into ladle 10.

The amount of inert gas flowing through pipe 26, and the amount and type of reagent(s) flowing from hoppers 22 and 24 are preferably controlled via controller 29 which communicates with hoppers 22 and 24 via lines 30, 32, and 34 and controls valves 36 and 38. Controller 29 also communicates with and controls valve 28.

The controller 29 is comprised of a computer (not shown), with a microprocessor, input and output devices, and communication modules; and it also includes a a software program (not shown) which evaluates a multiplicity of factors in determining how much of reagent A and how much of reagent B to charge to ladle 10. The controller 29 evaluates historical data and real-time data in determining how much of each of reagents A and B to charge to the ladle 10.

Referring again to FIG. 1, it will be seen that historical data is input to controller 29 via line 36. This historical data may include (but is not limited to) (1) the average and standard deviation weight of slag carried over from the furnace to the ladle 10 during previous manufacturing sessions, (2) the average weight percent of ferrous oxide and manganese oxide present in the steel making slag during previous manufacturing sessions, (3) the time it took to tap the batch of steel immediately made prior to the batch in question, (4) the weight of the batch of steel made during the session immediately prior to the batch in question, and (5) the average final slag composition for the grade of steel being made in the instant batch.

Referring again to FIG. 1, real time data in input to controller 29 via line 38. This real time data may include (but is not necessarily limited to) one or more of such factors as (1) the concentration, in parts per million, of oxygen dissolved in the steel before tapping, (2) the scheduled additions planned for the batch in question by the steel mill additions programs, which often involve the addition of materials such aluminum, alloys, calcium oxide, calcium aluminate, etc., (3) the chemical analyses of the steel prior to tapping, (4) the chemical analyses of the slag prior to tapping, (5) whether a slag retention device (such as a refractory shape) is being used in the process, (6) the amount of slag which actually went into ladle 10, and (7) the temperature of the steel.

Referring again to FIG. 1, it will be seen that camera 40 continously monitors the tapping stream fed via line 12 for the duration of the tap and, thus, can assist the controller 29 in determining the flow rate of the steel.

Armed with all the data charged via lines 36 and 38, controller 29 is able to calculate the amount of ferrous oxide and manganese oxide which needs to be reduced within ladle 10 in order to obtain the optimum refining slag. Based upon this calculation, the controller 29 then is capable of determining the amount of calcium-carbide containing material to be charged from hopper 22. In making such a calculation, it is desirable to note that the stoichiometric amount of calcium carbide required (3.0 moles of iron oxide per moles calcium carbide) is generally less than that which is required, for some of the calcium carbide is not effective. Thus, controller 29 utilizes an "efficiency number" to appropriately increase the amount of calcium carbide above the stoichiometric amount., Once the controller 29 calculates how much calcium carbide should be charged to the ladle 10, it then determines whether the reaction mixture within ladle 10 can tolerate the presence of such an amount of calcium carbide. As is known to those skilled in the art, in some systems the addition of calcium carbide to molten slag causes excessive foaminess of the slag, which often is undesirable. Additionally, since calcium carbide contains carbon, the controller must determine how much carbon the reaction mixture in the ladle 10 can stand; if too much carbon is present, it may adversely affect the properties of the steel made. The controller thus calculates how much less than the required amount of calcium carbide should be charged based upon the foaminess and carbon pick up considerations.

The shortfall of calcium carbide thus calculated is then made up with the addition of the aluminum material, which is caused to charge from hopper 24 in the required amount by the controller 29.

If the difference between the theoretically ideal amount of calcium carbide and the amount which can be tolerated by the system is less than about ten percent, then it is preferred to charge 90 percent of calcium carbide (by weight of carbide and aluminum material) from hopper 22, and 10 percent of aluminum material from hopper 24.

In any event, based upon all of the data fed into controller 29, the controller can determine factors such as the concentrations of the calcium carbide and the aluminum materials added, and the concentration(s), if any, of the flux material (s) added. In either event, the calcium carbide material and the aluminum material are added at or about the same time to the molten reaction mixture so that they act in concert with each other, cause an exothermic reaction to occur, and facilitate the formation of the desired refining slag.

The reagents added are generally present only within the slag layer 16. In general, the amount of calcium carbide in the slag layer 16, when added to the amount of aluminum in the slag 16, is of sufficient weight that, when such amounts are combined, they are equivalent to from about 0.5 to about 10 weight percent of the total mixture of slag on the ladle after tap, calcium carbide, and aluminum. The presence of such reagents in the slag on the ladle 10 after tap facilitates reactions which generally produce the desired refining slag in less than about 15 minutes.

In one embodiment, from about 2 to about 5 weight percent of the total mixture of slag on the ladle 10 after tap is calcium carbide and aluminum.

Considering only the calcium carbide and the aluminum reagents together, whatever form they may be in, the calcium carbide represents from about 5 to about 60 weight percent of the total weight of these two materials, and the aluminum represents from about 10 to about 50 weight percent of such total weight.

Prior to the introduction of the calcium carbide and the aluminum into ladle 10, molten steel in ladle 10 is generally maintained at a temperature of from about 2,600 to about 3,000 degrees Fahrenheit. After the introduction of the calcium carbide and the aluminum into ladle 10, it is preferred to continue maintaining the steel at such temperature of from about 2,600 to about 3,000 degrees Fahrenheit. Under such conditions, the desired refining slag is generally produced in less than about 15 minutes.

When one or more fluxing agents is used and is charged from hopper 22 and/or 24, the fluxing agent(s) is also used in an amount such that from about 0.5 to 10 weight percent (and preferably from about 2 to 5 weight percent) of such fluxing agent is present by weight of the total weight of the slag layer 16 (which will comprise slag, calcium carbide, aluminum, and one or more fluxing agents).

When one or more fluxing agent(s) is used, it is preferred that less than ten weight percent of the total amount of fluxing agent used is a metal carbonate. It is even more preferred that less than 5 weight percent of the fluxing agent is a metal carbonate.

If a metal carbonate is used in the configuration depicted in FIG. 1, it is preferred to charge it from hopper 24, with the aluminum.

When one or more fluxing agents is used, it is preferred to also use particulate glass with a particle size substantially identical to the calcium carbide. The amount of glass used is generally from about 0 to about 50 weight percent of the total amount of flux used, and preferably is from about 10 to about 30 weight percent.

When one or more fluxing agents is used, it is preferred to also use calcium fluoride. The amount of calcium fluorides used is generally from about 0 to about 30 weight percent of the total amount of flux used, and preferably is from about 10 to about 20 weight percent.

When one or more fluxing agents is used, it is preferred to also use calcium aluminate. The amount of calcium aluminate used is generally from about 0 to about 50 weight percent of the total amount of flux used, and preferably is from about 10 to about 30 weight percent.

When one or more fluxing agents is used, it is preferred to also use calcium oxide. The amount of calcium oxide used is generally from about 0 to about 50 weight percent of the total amount of flux used, and preferably is from about 5 to about 20 weight percent The following examples are used to illustrate the claimed invention but are not to be deemed limitative thereof. Unless otherwise stated, all parts are by weight, and all temperatures are in degrees Fahrenheit.

EXAMPLE 1

A batch of steel is produced in a basic oxygen converter. The final carbon content is 0.03% and the final oxygen potential as measured by a solid electrolyte disposable probe is 650 ppm. The taphole is relatively new, and the previous heat on this vessel tapped in 12 minutes. There were no reblows in the steel making process for this heat, and the oxygen lance is relatively new. The previous heat on this vessel was a similar grade of steel with similar conditions, and about 2000 lb. of slag were carried over into the ladle during the tapping of that previous heat. The FeO content of the slag in the vessel of the present heat is 31%. The MnO level is 5%. Based on the historical data and presently available real time data, it is estimated that the ladle slag after tap will contain 780 lb. of FeO+MnO. An acceptable level of these two oxides for this grade of steel is a total of no more than 4% in the ladle slag, or an estimated amount of about 240 lb. Thus, at least 540 lb. of FeO and MnO will be reduced by a slag reducing reagent. The amount of calcium carbide required to do this reduction, based on previous efficiency history, is 200 lb. This type of slag can accommodate about 150 lb. of calcium carbide without becoming excessively foamy. 150 lb. of calcium carbide will raise the carbon level of this grade by 0.003%. The maximum carbon level of this grade is 0.054%, and the project carbon content after tap is 0.042%. Therefore, 150 lb. of calcium carbide slag reductant will not raise the carbon level to above specification. Thus it is determined that 150 lb. of calcium carbide and 50 lb. of aluminum will be required in the slag reducing reagent. There are two materials available for addition, material A) contains 50% calcium carbide, 20% low melting point glass, 20% fluorspar and 10% calcium aluminate, and material B) contains 50% aluminum, 10% aluminum oxide, 35% calcium aluminate and 5 binding materials. Thus, the slag deoxidizer addition will be comprised of 300 lb. of material A and 100 lb. of material B, added prior to the end of tap. During tap, the slag carry over quantity is measured by an infra red camera, and is determined to be 2100 lbs. No further action is required, since the prediction was reasonably accurate.

EXAMPLE 2

A batch of steel is produced in a basic oxygen converter. The final carbon content is 0.03% and the final oxygen potential as measured by a solid electrolyte disposable probe is 650 ppm. The taphole is relatively new, and the previous heat on this vessel tapped in 12 minutes. There were no reblows in the steel making process for this heat, and the oxygen lance is relatively new. The previous heat on this vessel was a similar grade of steel with similar conditions, and about 2000 lb. of slag were carried over into the ladle during the tapping of that previous heat. The FeO content of the slag in the vessel of the present heat is 31%. The MnO level is 5%. Based on the historical data and presently available real time data, it is estimated that the ladle slag after tap will contain 780 lb. of FeO+MnO. An acceptable level of these two oxides for this grade of steel is a total of no more than 4% in the ladle slag, or an estimated amount of about 240 lb. Thus, at least 540 lb. of FeO and MnO will be reduced by a slag reducing reagent. The amount of calcium carbide required to do this reduction, based on previous efficiency history, is 200 lb. This type of slag can accommodate about 150 lb. of calcium carbide without becoming excessively foamy. 150 lb. of calcium carbide will raise the carbon level of this grade by 0.003%. The maximum carbon level of this grade is 0.054%, and the project carbon content after tap is 0.042%. Therefore, 150 lb. of calcium carbide slag reductant will not raise the carbon level to above specification. Thus it is determined that 150 lb. of calcium carbide and 50 lb. of aluminum will be required in the slag reducing reagent. There are two materials available for addition, material A) contains 50% calcium carbide, 20% low melting point glass, 20% fluorspar and 10% calcium aluminate, and material B) contains 50% aluminum, 10% aluminum oxide, 35% calcium aluminate and 5 binding materials. Thus, the slag deoxidizer addition will be comprised of 300 lb. of material A and 100 lb. of material B, added prior to the end of tap. During tap, the slag carry over quantity is measured by an infra red camera, and is determined to be 3000 lbs., or about 1000 lb. more than that predicted. A subsequent addition of 200 lb. of material B is immediately added before the ladle is removed from the tapping position. The steel is agitated using argon stirring, which causes the additional slag additive to react sooner and more completely within the slag.

EXAMPLE 3

A heat of ultra low carbon steel is tapped from a converter into a ladle, along with some steelmaking slag. The ladle full of steel is transported to an RH degassing vessel, where the carbon will be reduced to around 50 ppm. Prior to treatment, the slag depth is measured using a time of flight radar measurement, or an immersion pole, or other suitable device. Knowing the ladle dimensions and the density of slag, it is determined that there is about 3,000 lb. of slag on the surface of the steel in the ladle. The FeO+MnO content of this slag was measured to be 30%. It is known from historical data that during and after the degassing process, the FeO+MnO content will likely drop to around 27% due to reaction with components in the steel. The desirable FeO+MnO content of the slag prior to casting the steel should be less than 8%. It is thus determined that an addition of 200 lb. of aluminum is required to reduce the slag. In order to improve the reaction rate and efficiency of aluminum, the following slag additive composition, material C, is applied: 50% aluminum, 5% calcium carbide, 30% calcium aluminate, 10% glass, and 5% fluorspar. 400 lb. of material C is added to the slag just after the degassing process. Argon stirring of the steel is applied to mix the reagents and cause the reaction to proceed quickly and efficiently.

EXAMPLE 4

A batch of steel is produced in a basic electric arc melting furnace. The final carbon content is 0.08% and the final oxygen potential as measured by a solid electrolyte disposable probe is 500 ppm. The steel batch is tapped through an eccentric bottom taphole, typically leaving a molten steel heel in the furnace amounting to about 15% of the tap weight. The exact amount of the heel in the electric arc furnace is unknown, since various factors can influence this amount. Typically, about 800 lb., of furnace slag enter the ladle as the tapping process is completed. A camera monitors the tap and the actual amount of slag carried over into the ladle is estimated. Optionally, the slag depth is measured after tap. Based on the average slag carried into the ladle, and the chemistry of this slag, a standard addition is made to deoxidize the slag. The desired FeO+MnO content for this grade of steel is less than 2%. The amount of calcium carbide required for a standard slag deoxidizer addition for this situation is 80 lb., which amount will not cause excessive foaming. The maximum carbon level of this grade is 0.15%, so there is tolerance for any foreseen calcium carbide requirement. However, despite sufficient tolerance for calcium carbide alone, aluminum is also used in the slag treatment mixture to provide exothermicity and to aid the calcium carbide reaction. The slag reagent, material D, contains 40% calcium carbide, 10% aluminum, 25% glass and 25% fluorspar. 160 lb. of this material is added to the slag just at the end of tap. During tap, the slag carry over quantity is measured by a camera and computerized vision system, and is determined to be 1200 lb., or about 400 lb. more than that typically observed. The steel will be further processed and refined at a ladle arc reheating and treatment station. At this station, a subsequent addition of 80 lb. of material D is added to the ladle. The steel is agitated using argon stirring and heated with the arc, which causes the additional slag additive to react quickly and efficiently.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A slag composition comprised of steelmaking slag and from about 0.5 to about 10 percent of reducing agent by total weight of steelmaking slag and reducing agent, wherein:
    (a) said steelmaking slag is comprised of from about 25 to about 55 weight percent of calcium oxide, from about 10 to about 50 weight percent of ferrous oxide, from about 5 to about 20 weight percent of magnesium oxide, from about 5 to about 20 weight percent of silicon oxide, and from about 0.5 to about 8 weight percent of manganese oxide, and
    (b) said reducing agent is comprised of calcium carbide and elemental aluminum, wherein:
        1. from about 5 to about 80 weight percent of said reducing agent is comprised of said calcium carbide, and
        2. from about 10 to about 50 weight percent of said reducing agent is comprised of said elemental aluminum.

2. The slag composition as recited in claim 1, wherein said elemental aluminum is in the form of a particulate aluminum containing material.

3. The slag composition as recited in claim 2, wherein said calcium carbide is in the form of a a particulate calcium carbide containing material.

4. The slag composition as recited in claim 3, wherein at least about 90 weight percent of such particulate aluminum containing material is comprised of particles with a particle size in the range of from about 0.1 to about 0.7 inches.

5. The slag composition as recited in claim 4, wherein at least about 90 weight percent of such particulate calcium carbide containing material is comprised of particles with a particle size in the range of from about 0.1 to about 0.7 inches.

6. The slag composition as recited in claim 5, wherein the particle size distribution of said particulate aluminum containing material is substantially the same as the particle size distribution of said particulate calcium carbide containing material.

7. The slag composition as recited in claim 6, wherein said reducing agent is comprised of fluxing agent.

8. The slag composition as recited in claim 7, wherein said reducing agent is comprised of less than about 70 weight percent of said calcium carbide and said aluminum, and up to about 30 weight percent of fluxing agent.

9. The slag composition as recited in claim 8, wherein said slag composition is comprised of from about 0.5 to about 10 weight percent of said fluxing agent, by total weight of said steelmaking slag, said calcium carbide, and said aluminum.

10. The slag composition as recited in claim 9, wherein less than about 10 weight percent of said fluxing agent is comprised of metal carbonate.

11. The slag composition as recited in claim 10, wherein less than about 5 weight percent of said fluxing agent is comprised of metal carbonate.

12. The slag composition as recited in claim 9, wherein from about 10 to about 30 weight percent of said fluxing agent is comprised of glass.

13. The slag composition as recited in claim 9, wherein from about 10 to about 20 weight percent of said fluxing agent is comprised of calcium fluoride.

14. The slag composition as recited in claim 9, wherein from about 10 to about 30 weight percent of said fluxing agent is comprised of calcium aluminate.

15. The slag composition as recited in claim 9, wherein from about 5 to about 20 weight percent of said fluxing agent is comprised of calcium oxide.

16. The slag composition as recited in claim 12, wherein from about 10 to about 20 weight percent of said reducing agent is comprised of calcium fluoride.

17. The slag composition as recited in claim 16, wherein from about 10 to about 30 weight percent of said reducing agent is comprised of calcium aluminate.

18. The slag composition as recited in claim 14, wherein from about 5 to about 20 weight percent of said fluxing agent is comprised of calcium oxide.

* * * * *